United States Patent
Kaminsky et al.

(10) Patent No.: US 6,689,517 B1
(45) Date of Patent: Feb. 10, 2004

(54) FABRIC IMAGING ELEMENT

(75) Inventors: Cheryl J. Kaminsky, Rochester, NY (US); Robert P. Bourdelais, Pittsford, NY (US); Steven J. Neerbasch, Rochester, NY (US); Kalpana Singh, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/224,078

(22) Filed: Aug. 20, 2002

(51) Int. Cl.[7] .................. G03C 1/765; G03C 1/795; G03C 1/805; G03C 1/93; B41J 3/407
(52) U.S. Cl. ............... 430/11; 430/14; 430/259; 430/262; 430/263; 430/496; 430/533; 430/536; 430/538; 347/106
(58) Field of Search ................ 430/538, 533, 430/536, 11, 14, 262, 259, 263, 496; 347/106

(56) References Cited

U.S. PATENT DOCUMENTS

| | | | |
|---|---|---|---|
| 2,400,346 A | * 5/1946 | Glassey | 430/538 |
| 2,848,327 A | * 8/1958 | Eichorn | 430/538 |
| 3,072,482 A | * 1/1963 | Beeber et al. | 430/538 |
| 5,749,092 A | 5/1998 | Heeb et al. | 711/138 |
| 5,866,282 A | 2/1999 | Bourdelais et al. | 430/536 |
| 5,968,695 A | 10/1999 | Gula et al. | 430/536 |
| 6,087,079 A | 7/2000 | Newberry et al. | 430/536 |
| 6,114,078 A | * 9/2000 | Aylward et al. | 430/538 |
| 6,143,480 A | 11/2000 | Obayashi et al. | 430/332 |
| 6,245,710 B1 | 6/2001 | Hare et al. | 428/195 |
| 6,291,150 B1 | 9/2001 | Camp et al. | 430/536 |
| 6,300,053 B1 | 10/2001 | Fujiwara et al. | 430/619 |

* cited by examiner

*Primary Examiner*—Richard L. Schilling
(74) *Attorney, Agent, or Firm*—Paul A. Leipold

(57) ABSTRACT

The invention relates to an imaging element comprising at least one image layer and a base wherein said base comprises an upper polymer sheet having an elastic modulus of between 500 and 6,000 MPa said upper sheet being adhered to a textile having a roughness of between 0.8 and 8.0 micrometers, and a lower polymer sheet adhered to said textile.

55 Claims, No Drawings

FABRIC IMAGING ELEMENT

FIELD OF THE INVENTION

The invention relates to imaging output materials. In a preferred form it relates to the use of a laminated fabric base material for silver halide and ink jet images.

BACKGROUND OF THE INVENTION

It is known to create images on fabric, with paintings on canvas and screen printing fabric. It has been desired to obtain the look of an image on fabric using silver halide imaging and inkjet printing.

Prior art methods of generating photographic quality images on fabric are time consuming and costly. The photographer prints the silver halide image on regular silver halide imaging paper and carefully peels the emulsion layer off the paper support. It can take several tries, ruining many images, before the emulsion is peeled off of the support in one piece. The emulsion layer is then glued onto a fabric and placed in a press where pressure is applied to the emulsion and fabric so the emulsion takes on the surface characteristics of the fabric. This long and involved process is the reason for the high prices of photographic "canvas" prints.

The use of inkjet printing techniques to print on textiles has met with several problems. First, and in spite of the large number of inkjet inks currently available, inkjet printed images on textiles are often of low quality. For example, the printed images often smear upon handling, exhibit bleed (the intrusion of one color into an adjacent color), are moisture sensitive, and are dull, i.e., colored inks when printed fail to accurately produce the expected hues. Moreover, the printed images are often neither water-fast nor detergent-resistant, resulting in fading of the printed image after washing. Printed textile images with these drawbacks are wholly unacceptable to the textile industry, which requires not only that the image be both water-resistant and detergent-resistant, but also that the colors and hues are those deemed acceptable in the textile field. In addition, the textile industry also demands that while the colorant of the ink must adhere tenaciously to the substrate, it also must not alter the desirable hand properties of the substrate. This combination of requirements is very difficult to accomplish. Furthermore, fabrics tend to have loose fibers that clog the inkjet print head causing plugged nozzles and degraded imaged quality.

Prior art imaging elements are typically glossy and have a low surface roughness. The desired approach for typical imaging elements is to reduce the roughness of the base by providing a thick polymer coating on paper or laminate the paper with a high modulus biaxially oriented polymer sheet. U.S. Pat. No. 5,866,282 (Bourdelais et al) provides a method for reducing the roughness of paper by lamination of 0.22 micrometer cellulose paper with high modulus biaxially oriented polymer sheets. The resulting imaging element is smooth and very low in surface roughness.

U.S. Pat. No. 6,300,053 (Fujiwara et al.) relates to a photothermographic element where the support could be fabric. This fabric could be coated with a polymer. While the photothermographic imaging element does provide an acceptable image, the surface replication of the fabric is too low to provide the look and feel to the image. High surface replication fabric imaging elements are desirable in that they provide a unique look and feel that allows commercial display imaging to use texture to provide a look consistent with images that have a high textural content such as clothing, animals and upholstery.

U.S. Pat. No. 6,143,480 (Obayashi at al.) relates to a leuco dye and image recording medium wherein the base could be a non-woven fabric. U.S. Pat. No. 6,297,001 (Takiguchi et al.) relates to thermally developable photosensitive materials where the base could be fabric or cotton fabric. In this patent, the fabric is not polymer coated or sized, the fabric has a tendency to absorb the dye making the image less saturated. In the present invention, the fabric is protected form the imaging element by a polymeric sheet keeping the entire imaging element at the surface of the structure creating a saturated image.

U.S. Pat. No. 6,291,150 (Camp et al.) relates to a fabric as a base in a laminated structure for a silver halide imaging element. While the fabric base does provide a fabric image, the replication of the fabric is low and does not yield the desired look and feel of a differentiated imaging element. Fabrics disclosed have low roughness as the intent was to provide glossy image elements.

U.S. Pat. No. 5,749,092 (Arrington) relates to a polymer/glass matrix of polymer and glass fibers for use as a photographic support for increased stiffness. While the glass fiber does provide increased strength, the glass fiber is not woven into a pattern and thus does not add the desired textural appeal.

U.S. Pat. No. 6,245,710 (Hare et al.) relates to an imaging transfer system and process for transferring a thermal recording image to a receptor element where the receptor element is fabric. The fabric receiving element is not polymer coated or sized making the image less saturated because the fabric has a tendency to absorb the dye.

PROBLEM TO BE SOLVED

There is a need to provide a textural quality to high quality images while at the same time not interfering with image formation.

SUMMARY OF THE INVENTION

The invention provides an imaging element comprising at least one image layer and a base wherein said base comprises an upper polymer sheet having an elastic modulus of between 500 and 6,000 MPa said upper sheet being adhered to a textile having a roughness of between 0.8 and 8.0 micrometers, and a lower polymer sheet adhered to said textile.

ADVENTAGEOUS EFFECT OF THE INVENTION

The invention provides an imaging element that has the look and feel of a textural fabric material. The invention also provides the bi-directional strength and fire resistance to the imaging element.

DETAILED DESCRIPTION OF THE INVENTION

It has been found that a composite material consisting of a textile and polymer sheet to form a base for an imaging elements such as ink jet receiver layers or light sensitive silver halide imaging systems, eliminates some of the issues surrounding printing with imaging directly onto fabric while still maintaining the look and feel of fabric. By separating the imaging layer and the fabric with a laminated a plastic film the imaging layer takes on the texture of the film, but the imaging layer does not penetrate the film. Because the imaging chemistry is concentrated at the top of the imaging element, the image has higher chroma and is more saturated.

With an environmental protection film placed over the image, the image is also water and detergent-fast. The laminated structures also prevent stray fibers from the fabric from clogging inkjet heads or contaminating silver halide developing chemistry. In the case of a silver halide print, the processing steps of striping the emulsion layer and reattaching it to a cloth could be eliminated by using the silver halide laminated fabric image. The silver halide image would be formed directly onto the laminated fabric with the desired surface texture.

The texture and feel of fabric is valued for commercial printing, portraits and painting re-prints. The texture and feel of the fabric material is difficult to reproduce using prior art cellulose paper fiber base material which tend to yield smooth continuous surfaces. Further, the textile imaging element of the invention provides a significant strength improvement compared to paper base imaging systems allowing the invention material to be used for commercial printing, sails, furniture slip covers, cat scratch post, and wall coverings.

Woven fabrics that are made from thermoplastic yarns tend to disassemble along the cut edge when cut and subsequently handled. This disassembly occurs as the result of the untangling of the warp and weft yarns and is commonly known as raveling. Raveling significantly reduces the efficiency of subsequent article handling operations such as winding and unwinding and shipping and seriously reduces the strength of the fabric at its edges. Various physical procedures have been proposed and adopted to prevent edge raveling. These include fusing the warp and weft yarns along the cut edge by various means during the cutting process. Processes known to be commonly used in this regard are based on hot-die slitting and laser cutting methods. Generally, these methods are unacceptably slow or add significant costs to the production of the finished article.

The invention uses ultrasonic cutting to cut and seal the edge of the imaging support using fabric as the support material. The ultrasonic slitting method slits and seals in one step the thermoplastic fabric, laminates, and polymer films together to prevent edge penetration due to silver halide photo finishing. These and other advantages will be apparent from the detailed description below.

"Textile" and "fabric" means any knit, woven or spun-bonded fabric utilizing long fibers or yarns containing mono-filaments or multiple filaments. Cellulose paper materials consisting of short fibers that are formed on a wire are excluded from this definition. Examples of yarn materials include cotton, denim, polyacrylics, polyamides, polyesters, polyolefins, rayons, wool, linen, jute, sisal, regenerated cellulosic fibers such as rayon or cellulose acetate, leather, and combinations thereof. The fabric may be constructed of natural, synthetic or polymer fibers such as cotton, rayon, polyester, polyamide, polyacrylic and the like. Preferred fabrics are constructed from polyester fibers and blends of such fibers either in the individual yarns or in combinations of different yarns. The yarns employed to produce the textile fabric substrate may also be continuous filaments or spun yarns. As used herein the term "nonwoven fabric" means a web having a structure of individual fibers or threads which are interlaid, but not in an identifiable manner as in a woven fabric. Woven textile are those having continuous fibers with crosswise threads alternatively under and over lengthwise threads. Nonwoven fabrics or webs have been formed by many processes such as for example, meltblowing processes, spunbonding processes, and bonded-carded-web processes.

"Fiber" is any natural or synthetic fiber, in continuous filament or staple form, which may be spun, knitted, woven, pressed or otherwise formed into a textile material or fabric, including silks, cottons, wool, leather, fur, alpaca, llama, camel, cashmere, angora, vicuna, guanaco, other animal hair, kapok, linen, flax, jute, manila, alfa, coconut, broom, ramie, sisal, polyesters, acetates, triacetates, rayon, rayon-acetates, cellulose, polypropylene-cellulose, alginates, cupro (regenerated cellulose), modal, regenerated protein fiber, polyacryl, polychloride, fluorofiber, modacryl, polyacrylonitrile, polyamide (including nylon), polyethylene, polypropylene, polyurea, polyurethane, vinylal, trivinyl, elastodiens, elasthane, and mixtures of these natural and synthetic fibers, among others.

The terms as used herein, "top", "upper", "image receiving layer side", and "face" mean the side or toward the side of the fabric carrying the image or image receiving layer. The terms "bottom", "lower side", and "back" mean the side or toward the side opposite of the imaging layers or the imaging receiving layers.

The surface roughness or $R_a$ is a measure of surface irregularities or textures of a surface. For the invention, the roughness average, $R_a$, is the sum of the absolute value of the difference of each discrete data point from the average of all the data divided by the total number of points sampled. The textile has a surface roughness of 0.8 to 8.0 micrometers. When the surface roughness of the textile is less than 0.6 micrometers, the textile roughness approaches the roughness of paper and the textile structure can not be detected through the image. When the surface roughness average is greater than 10.0 micrometers, puddling of the emulsion or dye receiving layers occurs creating density differences across the imaging element. Puddling occurs on a rough surface when the emulsion fills in the large and deep valleys in the surface texture creating differences in the thickness of the image layer coating and thus differences in density across the imaging element. Most preferred is a textile with a surface roughness of between 4.0 and 6.0 micrometers. It has been shown that this range of average surface roughness for textiles creates a textile look for the imaging element without puddling.

The upper polymer sheet has an elastic modulus, also known as Young's modulus, of between 500 and 6,000 MPa. Below 450 MPa the polymer sheet replicates the surface roughness of the fabric to too great an extent and causes puddling of the imaging layer. For example, if a textile had a surface roughness of 4 microns and a polymer sheet that had an elastic modulus of 300 Mpa was applied to the surface of the textile, the surface roughness of the textile with the polymer sheet would be essentially the same as the original textile sheet and puddling would occur. Above 7,000 MPa, the polymer sheet will not replicate the surface roughness of the textile enough to give the desired textile look. The polymer sheet would be too stiff to follow the roughness of the textile and instead cover it over making the imaging element smooth. Most preferably, the upper polymer sheet has an elastic modulus of between 800 and 4,000 MPa. It has been shown that with the elastic modulus in the range, the roughness of the textile is maximized for the textile look, while puddling is avoided.

In the imaging element of the invention the suitable thickness of the textile is between 75 and 750 micrometers. When the textile is thinner than 60 microns or thicker than 850 microns it has been shown that the imaging element is difficult to handle in conventional printing processes, such as silver halide and inkjet. When the textile is too thin, the imaging element lacks stiffness and will not transport correctly though the processing machinery. When the textile is too thick, the imaging element becomes too thick to transport though processors and becomes difficult for slitting and sealing the edges.

Preferably, the textile has less than 2 millimeters of edge penetration during image processing. When silver halide photographic support is processed, the chemicals penetrate the slit edges of the support to a measured width and leave a stain of the chemicals. Over 3.5 millimeters of edge penetration is readily visible to the observer's eye and customers find the edge staining objectionable. As the edge penetration increases, it can sometimes be viewed not only on the back of the support (opposite side form the imaging element), but can be seen through the imaging layer if the stain is dark and the image is light colored at the edges. An edge penetration of less than 2 millimeters is generally not seen by the consumer.

Preferably, the textile comprises a woven polymer. The woven polymer could be any polymer fibers that could be woven giving the imaging element strength and durability. The woven polymer could be, but is not limited to polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers can be used.

Furthermore, when the imaging element is slit or cut, if ultrasonic slitting is applied, the textile can melt with the polymer sheets forming a solid plastic barrier to edge penetration of chemistry. Woven polymers are easily processed, widely available, and have a wide range of roughness of the woven texture.

A textile of woven fiberglass is preferred in some embodiments. Fiberglass is tough and fireproof making it ideal for signage and displays. Woven fiberglass also adds stiffness to the imaging element. Additionally, the woven fiberglass can be incased easily in a matrix of polymer, which could be a fire retardant and sizing agent, to create a fire resistant and non-absorbing textile for the imaging element. This adjunct bond between the fabric and polymer matrix is strengthened because the resin will flow to a certain extent into the interstices of the glass fabric and cover the overlaps of the weft and warp knuckles of the cloth. The fabric itself is thus strengthened by the resin coating.

The fabric comprising a fire retardant is preferred. Convention Halls have requirements about the display materials used in the shows because of the great fire hazard if the display materials are flammable. Having fire resistant fabrics is also necessary for children's clothing, wallpaper, and tents. Having the fire retardant in the fabric can create fire resistant printed textile products that do not need a separate fire retardant treatment after processing because it is built into the fabric.

Most preferably, the fire retardant is a brominated aliphatic compound provided such compounds have at least one hydrogen atom attached to a carbon atom that is adjacent to a carbon atom containing at least one bromine atom. Brominated aliphatic compounds provide exemplary fire resistance and are easily incorporated into synthetic polymer fabrics. Representative brominated aliphatic compounds include, but are not limited to, hexabromocyclododecane; tris (2,3-dibromopropyl)phosphate; tetrabromovinylcyclohexene; tetrabromocyclooctane; pentabromochlorocyclohexane; 1,2-dibromo-methyl)cyclohexane; hexabromo-2-butene; and 1,1,1,3-tetrabromononane. Particularly preferred brominated aliphatic flame retardant compounds include hexabromocyclododecane and its isomers, pentabromocyclohexane, and its isomers. Other suitable brominated fire retardant compounds include tribromodiphenyl ether, tetrabromodiphenyl ether, pentabromodiphenyl ether, hexabromodiphenyl ether, tribromochlorodiphenyl ether, tribromodichlorodiphenyl ether, trichlorodiphenyl ether, tetrabromodichlorodiphenyl ether, octobromodiphenyl ether, decabromodiphenyl ether, the 2-ethylhexyl, n-octyl, nonyl, butyl, dodecyl and 2,3-dioxypropyl ethers of tribromophenyl, tribromochlorophenyl, tribromodichlorophenyl, tetrabromobisphenol A, dioctyl ester of tetrabromophthalic acid. The fire retardant may comprise a mixture of one or more brominated fire retardants. The brominated fire retardant preferably comprises between about 0.2 and about 10.0 and more preferably between about 0.6 and about 2.5 weight percent elemental bromine based upon the total weight of thermoplastic material in the composite structure.

Textile and fabric comprising hollow fibers is preferred in some embodiments. The hollow fibers give strength to the textile and also impart a different look to the material. As the light passes through the textile and is reflected back through the image to create a reflection print, the light is reflected at different points in the hollow fiber in the air void center of the fiber. These different reflection planes of the surface of the fiber and the inside air core of the fiber create a nacreous appearance to the reflected image. Materials for such a hollow fiber used are polymers such as cellulose, cellulose acetate, polyamide, polyacrylonitrile, ethylene-vinylalcohol copolymer, poly(methyl methacrylate) and polysulfone. Among these, hollow fiber membranes comprising a polysulfone resin are superior in heat resistance, chemical resistance, mechanical strength, biological compatibility and the like.

In another embodiment of the invention, textiles comprising a fabric of cotton, silk, sisal, wool, flax, or other natural fibrous material are preferred. Using natural fibers is preferred because the imaging element has more of the fabric feel to the image. Printed clothing or other apparel can be created using natural fibers as the textile. Furthermore, different natural fibers or mixtures thereof can be used to impart different characteristics to the imaging element.

The bottom polymer sheet preferably is provided with indicia. The bottom biaxially oriented polyolefin sheet preferably is reverse printed such that when the bottom biaxially oriented polyolefin sheet is laminated to the voided polyester base with the printed side laminated to the voided polyester, the indicia is protected from photographic processing chemistry and consumer handling. The indicia may be one or more colors and may be applied by any method known in the art for printing on biaxially oriented sheets. Examples include gravure printing, off set lithography printing, screen printing and ink jet printing.

Preferably, the upper polymer sheet generally replicates the surface of the textile. Most preferred is an 80% replication of the textile surface by the upper polymer sheet. This means that the roughness average of the polymer sheet with laminated to the textile is at least 80% of the surface roughness average of the textile. Replication of the textile surface by the upper polymer sheet gives the imaging element the textile look while protecting the fabric from processing chemistry and keeping the imaging layer on the surface of the imaging element making it more saturated. Without replication of the textile, the imaging element would be flat and smooth and not appear to be a textile texture. Replication of at least 80% insures that the texture is replicated in the polymer sheet to achieve the textile look.

To model upper polymer replication of the textile, represent system as a supported beam (upper polymer sheet) at each end (by peaks of texture of textile) with a distributed load across the beam. The maximum deflection of the upper polymer sheet in the y (vertical) direction is:

$$y=5PL^3/384EI$$

where P is the applied load, L is the length of the span, E is the elastic modulus of the beam and I is the moment of inertia of the beam. The moment of inertia is defined by $$I=bh^3/12$$

Where b is the width if the beam an h is the thickness of the beam. Substituting into the deflection equation $$y=60PL^3/384Ebh^3$$

Using dynamic similitude, the length of the beam, the modulus of the beam, the width of beam along with the coefficient 60/384 can be replaced by a constant, k. The deflection y will be converted to a ratio of replication R where $$R=MPE_{final}/MPE_{initial}$$

Thus, the equation for deflection becomes $$R \cong KP/h^3$$

Since the effects of P are not known, the equation reduces to $$R \cong K/h^3$$

(P is mostly inversely proportional to R) From the traces R=100/1000=0.1. Solving for K knowing h=35.6 micrometers, K=4.50*10$^{-9}$ cm$^3$. The object is to find an h (thickness of the upper polymer layer) where R (ratio of replication) is zero. Plugging in R=0.001 (almost no replication) into the equation, h=165 micrometers. This means that when the upper polymer layer is 165 micrometers or greater, there is essentially no replication of the textile surface underneath (assuming that the approximations in the model are true).

For the upper polymer sheet, suitable classes of thermoplastic polymers for the upper sheet comprise polyolefins and polyesters. Suitable polyolefins include polypropylene, polyethylene, polymethylpentene, polystyrene, polybutylene and mixtures thereof. Polyolefin copolymers, including copolymers of propylene and ethylene such as hexene, butene, and octene are also useful. Polypropylene is preferred, as it is low in cost and has desirable strength properties.

In another embodiment of the invention, polyester is preferred because it has improved resistance to tearing. Suitable polyesters include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof. Such polyesters are well known in the art and may be produced by well-known techniques, e.g., those described in U.S. Pat. No. 2,465,319 and U.S. Pat. No. 2,901,466. Preferred continuous matix polyesters are those having repeat units from terephthalic acid or naphthalene dicarboxylic acid and at least one glycol selected from ethylene glycol, 1,4-butanediol and 1,4-cyclohexanedimethanol. Poly(ethylene terephthalate), which may be modified by small amounts of other monomers, is especially preferred. Other suitable polyesters include liquid crystal copolyesters formed by the inclusion of suitable amount of a co-acid component such as stilbene dicarboxylic acid. Examples of such liquid crystal copolyesters are those disclosed in U.S. Pat. Nos. 4,420,607; 4,459,402; and 4,468,510.

The bottom sheet is preferably adhered to the textile or fabric with a pressure sensitive adhesive. The pressure sensitive adhesive could be permanent or repositionable. The pressure sensitive adhesive must provide excellent adhesion between the textile and the bottom sheet for the useful life of the image. The preferred method of adhering the textile and the bottom sheet is by use of an adhesive. The adhesive preferably is coated or applied to the base sheet. The adhesive preferably is a pressure sensitive adhesive or heat activated adhesive. During the bonding process, the imaging layer is adhered to the base by use of a nip roller or a heated nip roll in the case of a heat activated adhesive. A preferred pressure sensitive adhesive is an acrylic-based adhesive. Acrylic adhesives have been shown to provide an excellent bond between gelatin developed imaging layers and biaxially oriented polymer base sheets.

The preferred adhesive materials may be applied using a variety of methods known in the art to produce thin, consistent adhesive coatings. Examples include gravure coating, rod coating, reverse roll coating and hopper coating. The adhesives may be coated on the biaxially oriented sheets of this invention prior to lamination or may be used to laminate the biaxially oriented sheets to the textile.

The lower polymer sheet that comprises a release layer for said adhesive that repositions is preferred. The release layer allows for uniform separation of the adhesive at the adhesive substrate interface. The release layer may be applied to the substrate by any method known in the art for applying a release layer to substrates. Examples include silicon coatings, tetrafluoroethylene flurocarbon coatings, fluorinated ethylene-propylene coatings and calcium stearate.

As used herein, the phrase "photosensitive silver halide" is a material that utilizes photosensitive silver halide in the formation of images. The imaging element where at least one image layer is formed using photosensitive silver halide is preferred because of the superior image quality of silver halide images and the abundance of exposing and processing infrastructure available in the world. Silver halide is also a very cost effective way of creating high quality images. The photographic elements can be black and white, single color elements or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

At least one imaging layer formed by ink jet printing, is preferred. The ink-jet type printing apparatus holds various advantages in that an ink-jet head can be made compact easily, high definition image can be printed at high speed, a running cost is low, a noise level is low for non-impact type printing, and a multi-color printing employing a plurality of colors of inks can be done easily. Furthermore, because inkjet is a digital system, each image can be different.

The ink used in the invention usually contains a colorant such as a pigment or dye. Suitable dyes include acid dyes, direct dyes, water soluble dyes or reactive dyes listed in the COLOR INDEX but is not limited thereto. Metallized and non-metallized azo dyes may also be used as disclosed in U.S. Pat. No. 5,482,545, the disclosure of which is incorporated herein by reference. Other dyes which may be used are found in EP 802246-A1 and JP 09/202043, the disclosures of which are incorporated herein by reference.

Any of the known organic pigments can be used to prepare ink jet inks used in the invention. Pigments can be selected from those disclosed, for example, in U.S. Pat. Nos. 5,026,427; 5,085,698; 5,141,556; 5,160,370 and 5,169,436, the disclosures of which are hereby incorporated by reference. The exact choice of pigment will depend upon the specific color reproduction and image stability requirements of the printer and application. For four-color printers, combinations of cyan, magenta, yellow and black (CMYK) pigments are used. An exemplary four color set is a cyan pigment, bis(phthalocyanylalumino)-tetraphenyldisiloxane, quinacridone magenta (pigment red 122), pigment yellow 74 and carbon black (pigment black 7).

The imaging element comprising a sizing polymer is preferred. The sizing polymer prevents edge penetration of water and silver halide process chemistry into the support and therefore eliminates the delamination of the polymer sheets and the textile and eliminates the stain occurring from edge penetration of the silver halide developing solution.

Preferably, the sizing polymers contain latex polymers. Latex polymers are not water soluble and have good adhesion to the fabric therefore creating a good seal on the cut end of the fabric against edge penetration. Examples of other commercially available water-insoluble polymers are: Carboset.RTM.1086, a poly(styrene/acrylic acid/2-ethylhexyl acrylate) latex, available from B.F. Goodrich Co., Akron, Ohio; Basoplast.RTM.250D, a latex of poly (acrylonitrilelbutyl acrylate), available from BASF Corporation, Charlotte, N.C.; Jetsize.RTM.Plus, a cationic poly(styrene/acrylate) latex, available from Eka-Nobel, Marietta, Ga.; Flexbond.RTM.381, poly(ethylene/vinyl acetate) latex, available from Air Products Corporation, Allentown, Pa.,; and Flexbond.RTM.325, poly(ethylene/vinyl acetate) latex, available from Air Products Corporation.

The sizing agent selected from the group consisting of alkoxysilanes, polyvinyl alcohol, polyvinyl acetate, aqueous epoxies and aqueous polyurethanes is preferred. These sizing polymers are very effective and easily applied and have excellent adhesion to fabric. These polymers fill and coat the fabric and fill in the gaps creating a barrier to water or chemistry penetration. The sizing agents may be used either singly or in combination. Conventional processes for treatment of sizing materials include screen printing, knife coating, padding, and the like.

An upper environmental protection layer over the image layer is preferred. The ability to provide the desired property of post-process water/stain resistance of the imaged element, at the point of manufacture of the imaging element, is a highly desired feature. However, in order to accomplish this feature, the desired imaging element should be permeable to aqueous solutions during the processing step, but achieve water impermeability after processing, without having to apply additional chemicals or to substantially change the chemicals used in the processing operation.

The environmental protection layer provides a discontinuous polymer overcoat to the imaging side of imaging elements, particularly photographic paper. The discontinuous polymer overcoat of the invention, while allowing a normal exposure and processing step, also provides a continuous, water-impermeable protective layer by using a post-process coalescing step, without substantial change or addition of chemicals in the processing step. The overcoat is formed by coating in a discontinuous manner an aqueous or volatile solvent solution comprising a dispersible or soluble polymer, or a polymer melt on the emulsion side of a sensitized photographic product. After exposure and processing, the product with image is subjected to a fusing step, wherein it is treated in such a way as to cause coalescence of the coated polymer patches, by heat and/or pressure, solvent treatment, or other means so as to form the desired continuous, water impermeable protective layer. In a preferred embodiment the polymer comprises a combination of low and high Tg polymers to enable post-process melt flow and coalescence during the fusing step. While it is well known to apply such combinations of polymers, in a continuous manner to elements bearing an image, the application of the same on an imaging element, during its manufacture, prior to any image formation will only work if the overcoat is applied in a discontinuous manner. Otherwise the flow from the low Tg component will cause coalescence prior to processing to give a continuous processing solution impermeable overcoat.

Examples of polymer solutions/dispersions used in this invention are derived can be selected from, for example, polymers of alkyl esters of acrylic or methacrylic acid such as methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, the hydroxyalkyl esters of the same acids such as 2-hydroxyethyl acrylate, 2-hydroxyethyl methacrylate, and 2-hydroxypropyl methacrylate, the nitrile and amides of the same acids such as acrylonitrile, methacrylonitrile, and methacrylamide, vinyl acetate, vinyl propionate, vinylidene chloride, vinyl chloride, and vinyl aromatic compounds such as styrene, t-butyl styrene and vinyl toluene, dialkyl maleates, dialkyl itaconates, dialkyl methylene-malonates, isoprene, butadiene, chlorinated propylene and copolymers therof. Suitable polymers containing carboxylic acid groups include polymers derived from acrylic monomers such as acrylic acid, methacrylic acid, ethacrylic acid, itaconic acid, maleic acid, fumaric acid, monoalkyl itaconate including monomethyl itaconate, monoethyl itaconate, and monobutyl itaconate, monoalkyl maleate including monomethyl maleate, monoethyl maleate, and monobutyl maleate, citraconic acid, and styrene carboxylic acid. Other polymers include ethyl cellulose, nitrocellulose, linseed oil-modified alkyd resins, rosin-modified alkyd resins, phenol-modified alkyd resins, phenolic resins, polyesters, poly(vinyl butyral), polyisocyanate resins, polyurethanes, polyamides, chroman resins, dammar gum, ketone resins, maleic acid resins, poly(tetrafluoroethylene-hexafluoropropylene), low-molecular weight polyethylene, phenol-modified pentaerythritol esters, copolymers with siloxanes and polyalkenes. These polymers can be used either alone or in combination. The polymers may be crosslinked or branched.

The upper polymer sheet comprising a layer of biaxially oriented microvoided polymer sheet where the microvoided polymer sheet comprises a series of microvoids separated by polymer matrix in the vertical direction such that said microvoided polymer sheet when reflecting light has an opalescent appearance is preferred. This microvoided upper polymer layer provides a photograph having an opalescent appearance particularly in the light areas, without a need for changing the chemistry of the imaging layers. The photographs of the invention are particularly desirable for use in photographs that will be displayed as they are eye-catching and unique. The photographs of the invention will also particularly appeal to children, as the metallic sheen and opalescent surface will attract their attention.

Preferably, the seal between the upper and lower polymer sheets prevent edge penetration. If the textile is not sealed with the polymer sheets and not protected in another way, the textile can act as a wick for developing chemistry pulling it inside the imaging element structure. This developing solution stains the support (textile) and can be seen on the backside of the support. The stain can also be seen through low density areas of the image. Edge penetration also causes delamination of the polymer films to the textile causing fraying and splitting edges.

The seal between the upper and lower polymer sheets has burst strength of at least 5 N. If the burst strength between the upper and lower polymer sheets is less than 3 N the seal could be broken during transport, handling, and processing and could create breaks in the seal and allow edge penetration to occur. Furthermore, if the burst strength is less than 3 N then consumer handling could break the seal and cause delamination of the edges and fraying of the fabric.

U.S. Pat. No. 3,697,357 discloses welding sheets made entirely or partially of thermoplastic material or fiber by sealing an area of material. U.S. Pat. No. 3,939,033 discloses using ultrasonics to simultaneously seal and cut thermoplastic textile material. U.S. Pat. No. 5,061,331 discloses an ultrasonic cutting and edge sealing apparatus for cutting and sealing semi-permeable and at least partially thermoplastic fabric.

In acoustic bonding or welding, such as ultrasonic welding, two parts to be joined (typically thermoplastic parts) are placed directly below an ultrasonic horn. In plunge bonding or welding, the horn plunges (travels toward the parts) and transmits ultrasonic vibrations into the top part. The vibrations travel through the top part to the interface of the two parts. Here, the vibrational energy is converted to heat due to intermolecular friction that melts and fuses the two parts. When the vibrations stop, the two parts solidify under force, producing a weld at the joining surface.

Continuous ultrasonic welding is typically used for sealing fabrics, films, and other parts. In the continuous mode, typically the ultrasonic horn is stationary and the part is moved beneath it.

Many uses of ultrasonic energy for bonding and cutting thermoplastic materials involve ultrasonic horns. A horn is an acoustical tool usually having a length of a multiple of one-half of the horn material wavelength and made of, for example, aluminum, titanium, or steel that transfers the mechanical vibratory energy to the part. (Typically, these materials have wavelengths of approximately 25 cm (10 in).) Horn displacement or amplitude is the peak-to-peak movement of the horn face. The ratio of horn output amplitude to the horn input amplitude is termed gain. Gain is a function of the ratio of the mass of the horn at the vibration input and output sections. Generally, in horns, the direction of amplitude at the face of the horn is coincident with the direction of the applied mechanical vibrations.

The invention uses ultrasonic cutting to cut and seal the edge of the imaging support using fabric as the support material. The ultrasonic slitting method seals the thermoplastic fabric, laminates, and polymer films together to prevent edge penetration due to silver halide photo finishing and other aqueous solutions. With ultrasonic slitting, the sheet is cut and the edges are sealed in one step saving process steps and money. Ultra sonic slitting simultaneously cutting and sealing the edges adjacent to the cut is preferred. Ultrasonic slitting can operate at relatively high speeds making it a quick processing step and melts the edges of the cut to form solid plastic edges to eliminate edge penetration of silver halide chemistry solutions.

Preferably, the ultrasonic horn has a frequency of between 18 and 26 Khz. Below 15 Khz, it has been shown that the edges of the cut are not melted completely leaving some of the fabric exposed to edge penetration. A horn frequency over 30 Khz has been shown to give no more advantage in edge penetration than frequencies of between 18 and 26 Khz and it uses more energy and the horn wears out faster and needs to be replaced more frequently.

Preferably, the upper and lower polymer sheets have glass transition temperature differences of less than 15 degrees Celsius. This ensures that when the imaging element is cut and melted that the polymer sheets surrounding the textile melt at the same rate so that there is complete encapsulation of the textile and that there is not waviness or curliness to the edges from different melting rates. The waviness or curliness of the edges can occur when the upper and lower polymer sheet glass transition temperatures are more than 20 degrees Celsius apart.

The textile having a glass transition temperature within 15 degrees Celsius from the upper and lower polymer sheets is preferred. It has been shown that when the glass transition temperature of the textile is within 15 degrees Celsius of the upper and lower polymer sheets, the three layers melt at the same rate and completely seal the imaging element. If the textile has a glass transition temperature over 20 degrees different than the surrounding polymer sheets, incomplete sealing (allowing for edge penetration) can occur or wavy or curly edges can be formed. These wavy or curly edges are unsatisfactory to the consumer.

The layers of the biaxially oriented polyolefin sheet have levels of voiding, $TiO_2$ and colorants adjusted to provide optimum transmission properties. The biaxially oriented polyolefin sheet is laminated to a textile for stiffness for efficient image processing, as well as product handling and display. Further, the thin polyolefin skin layer on the top of the biaxially oriented polyolefin sheet of this invention can be optimized for image receiving layer adhesion. One example is a thin layer of biaxially oriented polycarbonate allows a solvent based polycarbonate dye receiver layer typical of thermal dye transfer imaging to adhere to the base without an expensive primer coating.

Any suitable biaxially oriented polyolefin sheet may be utilized for the upper polymer sheet. Microvoided composite biaxially oriented sheets are preferred because the voids provide opacity without the use of $TiO_2$. Microvoided composite oriented sheets are conveniently manufactured by coextrusion of the core and surface layers, followed by biaxial orientation, whereby voids are formed around void-initiating material contained in the core layer. Such composite sheets are disclosed in, for example, U.S. Pat. Nos. 4,377,616; 4,758,462; and 4,632,869.

The core of the preferred composite sheet should be from 15 to 95% of the total thickness of the sheet, preferably from 30 to 85% of the total thickness. The nonvoided skin(s) should thus be from 5 to 85% of the sheet, preferably from 15 to 70% of the thickness.

The optical properties of the imaging elements in accordance with the invention are improved as the color materials may be concentrated at the surface of the biaxially oriented sheet for most effective use with little waste of the colorant materials. Photographic materials utilizing microvoided sheets and textiles of the invention have improved resistance to tearing. The invention allows faster hardening of photographic paper emulsion, as water vapor is not transmitted from the emulsion through the biaxially oriented sheets.

The photographic elements of this invention utilize a low cost method for printing multiple color branding information of the back side of the image increasing the content of the information on the back side of the image.

The imaging elements of this invention utilize an integral emulsion bonding layer that allows the emulsion to adhere to the support materials during manufacturing and wet processing of images. The microvoided sheets are laminated to the textile utilizing a bonding layer that prevents delamination of the biaxially oriented sheets from the base paper. These and other advantages will be apparent from the detailed description below.

The layers of the upper biaxially oriented polyolefin sheet of this invention have levels of voiding, optical brightener and colorants adjusted to provide optimum optical properties for image sharpness, lightness and opacity. An important aspect of this invention is the voided polymer layer(s) under the silver halide image layer. The microvoided polymer layers in the oriented polyolefin sheet and the textile base provides acceptable opacity, sharpness and lightness without the use of expensive white pigments that is typical with prior art materials. Because the use of white pigments is avoided, the dye hue of color dye couplers coated on the support of this invention is significantly improved yielding an image with snappy color. The preferred percent transmission for the reflective support material of this invention is between 0 and 5%. For a reflective support material, transmission of a significant amount of light is undesirable as light illuminates the logo printing on the back of the image, reducing the quality of the image during viewing. A percent transmission greater than 7% allows enough light to be transmitted during image viewing to reduce the quality of the image.

The upper and lower biaxially oriented polyolefin sheets of the invention are laminated to a textile or fabric core of the invention for stiffness and for efficient image processing as well as consumer product handling. Lamination of high strength biaxially oriented polyolefin sheets to the textile significantly increases the tear resistance of the photographic element compared to present photographic paper core. Because the white pigments have been significantly reduced in the upper biaxially oriented sheet, the textile is required to maintain image opacity to reduce image show through. The biaxially oriented sheets are laminated to the textile with an ethylene metallocene plastomer that allows for lamination speeds exceeding 500 meters/min and optimizes the bond between the textile and the biaxially oriented polyolefin sheets.

The biaxially oriented sheets used in the invention contain an integral emulsion bonding layer which avoids the need for expensive priming coatings or energy treatments. The bonding layer used in the invention is a low density polyethylene skin on the biaxially oriented sheet. Gelatin based silver halide emulsion layers of the invention have been shown to adhere well to low density polyethylene when used in combination with corona discharge treatment. The integral bonding skin layer also serves as a carrier for the blue tints that correct for the native yellowness of the gelatin based silver halide image element. Concentrating the blue tints in the thin, skin layer reduces the amount of expensive blue tint materials when compared to prior art photographic papers that contain blue tint materials.

The backside of the photographic element is laminated with a biaxially oriented sheet to reduce humidity image curl. There are particular problems with prior art color papers when they are subjected to extended high humidity storage such as at greater than 50% relative humidity. The high strength biaxially oriented sheet on the backside resists the curling forces, producing a much flatter image. The biaxially oriented sheet on the back has roughness at two frequencies to allow for efficient conveyance through photographic processing equipment and improved consumer writability as consumers add personal information to the back side of photographic paper with pens and pencils. The biaxially oriented sheet also has an energy to break of $4.0 \times 10^7$ joules per cubic meter to allow for efficient chopping and punching of the photographic element during photographic processing of images.

Preferred biaxially oriented sheets are disclosed in U.S. Pat. Nos. 5,866,282; 5,888,683; 6,030,742 and 6,040,124. Suitable classes of thermoplastic polymers for the upper and lower biaxially oriented sheet core and skin layers include polyolefins, polyesters, polyarnides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers can be used.

Suitable polyolefins for the core and skin layers of the backside sheet include polypropylene, polyethylene, polymethylpentene, and mixtures thereof. Polyolefin copolymers, including copolymers of propylene and ethylene such as hexene, butene and octene are also useful. Polypropylenes are preferred because they are low in cost and have good strength and surface properties.

Suitable polyesters include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof. Such polyesters are well known in the art and may be produced by well-known techniques, e.g., those described in U.S. Pat. No. 2,465,319 and U.S. Pat. No. 2,901,466. Preferred continuousmatix polyesters are those having repeat units from terephthalic acid or naphthalene dicarboxylic acid and at least one glycol selected from ethylene glycol, 1,4-butanediol and 1,4-cyclohexanedimethanol. Poly(ethylene terephthalate), which may be modified by small amounts of other monomers, is especially preferred. Other suitable polyesters include liquid crystal copolyesters formed by the inclusion of suitable amount of a co-acid component such as stilbene dicarboxylic acid. Examples of such liquid crystal copolyesters are those disclosed in U.S. Pat. Nos. 4,420,607; 4,459,402; and 4,468,510.

Useful polyamides include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the composite sheets include cellulose nitrate, cellulose triacetate, cellulose diacetate, cellulose acetatepropionate, cellulose acetate butyrate, and mixtures or copolymers thereof. Useful polyvinyl resins include polyvinyl chloride, poly(vinyl acetal), and mixtures thereof. Copolymers of vinyl resins can also be utilized.

When using a textile in the base, it is preferable to extrusion laminate the top and bottom biaxially oriented polymer sheets to the textile using a polyolefin resin. Extrusion laminating is carried out by bringing together the biaxially oriented sheets of the invention and the textile base with application of an adhesive between them followed by their being pressed in a nip such as between two rollers. The adhesive may be applied to either the upper or lower biaxially oriented sheets or the textile prior to their being brought into the nip. In a preferred form the adhesive is applied into the nip simultaneously with the biaxially oriented sheets and the textile.

The bonding agent used for bonding biaxially oriented sheets to textile is preferably selected from a group of resins that can be melt extruded at about 160.degree. C. to 300.degree. C. Usually, a polyolefin resin such as polyethylene or polypropylene is used.

Adhesive resins are preferred for bonding upper and lower biaxially oriented sheets to the textile. An adhesive resin used in this invention is one that can be melt extruded and provide sufficient bond strength between the textile and the biaxially oriented sheet. For use in the conventional photographic system, peel forces between the paper and the biaxially oriented sheets need to be greater than 150 grams/5 cm to prevent delamination during the manufacture of the photographic base, during processing of an image or in the final image format. "Peel strength" or "separation force" or "peel force" is the measure of the amount of force required to separate the biaxially oriented sheets from the textile. Peel strength is measured using an Instron gauge and the 180 degree peel test with a cross head speed of 1.0 meters/min. The sample width is 5 cm and the distance peeled is 10 cm.

In the case of a silver halide photographic system, suitable adhesive resins must also not interact with the light sensitive emulsion layer. Preferred examples of adhesive resins are ionomer (e.g. an ethylene metharylic acid copolymer cross linked by metal ions such as Na ions or Zn ions), ethylene vinyl acetate copolymer, ethylene methyl methacrylate copolymer, ethylene ethyl acrylate copolymer, ethylene methyl acrylate copolymer, ethylene acrylic acid copolymer, ethylene ethyl acrylate maleic anhydride copolymer, or ethylene methacrylic acid copolymer. These adhesive resins are preferred because they can be easily melt extruded and provide peel forces between biaxially oriented polyolefin sheets and base paper greater than 150 grams/5 cm.

Metallocene catalyzed polyolefin plastomers are most preferred for bonding oriented polyolefin sheets to textile because they offer a combination of excellent adhesion to smooth biaxially oriented polyolefin sheets, are easily melt extruded using conventional extrusion equipment and are low in cost when compared to other adhesive resins. Metallocenes are class of highly active olefin catalysts that are used in the preparation of polyolefin plastomers. These catalysts, particularly those based on group IVB transition metals such as zirconium, titanium, and hafnium, show extremely high activity in ethylene polymerization. Various forms of the catalyst system of the metallocene type may be used for polymerization to prepare the polymers used for bonding biaxially oriented polyolefin sheets to cellulose paper. Forms of the catalyst system include but are not limited to those of homogeneous, supported catalyst type, high pressure process or a slurry or a solution polymerization process. The metallocene catalysts are also highly flexible in that, by manipulation of catalyst composition and reaction conditions, they can be made to provide polyolefins with controllable molecular weights. Suitable polyolefins include polypropylene, polyethylene, polymethylpentene, polystyrene, polybutylene and mixtures thereof. Development of these metallocene catalysts for the polymerization of ethylene is found in U.S. Pat. No. 4,937,299 (Ewen et al).

The most preferred metallcoene catalyzed copolymers are very low density polyethylene (VLDPE) copolymers of ethylene and a $C_4$ to $C_{10}$ alpha monolefin, most preferably copolymers and terpolymers of ethylene and butene-1 and hexene-1. The melt index of the metallocene catalyzed ethylene plastomers preferable fall in a range of 2.5 g/10 min to 27 g/10 min. The density of the metallocene catalyzed ethylene plastomers preferably falls in a range of 0.8800 to 0.9100. Metallocene catalyzed ethylene plastomers with a density greater than 0.9200 do not provide sufficient adhesion to biaxially oriented polyolefin sheets.

Melt extruding metallocene catalyzed ethylene plastomers presents some processing problems. Processing results from earlier testing in food packaging applications indicated that their coating performance, as measured by the neck-in to draw-down performance balance, was worse than conventional low density polyethylene making the use of metallocene catalyzed plastomers difficult in a single layer melt extrusion process that is typical for the production of current photographic support. By blending low density polyethylene with the metallocene catalyzed ethylene plastomer, acceptable melt extrusion coating performance was obtained making the use of metallocene catalyzed plastomers blended with low density polyethylene (LDPE) very efficient. The preferred level of low density polyethylene to be added is dependent on the properties of the LDPE used (properties such as melt index, density and type of long chain branching) and the properties of the metallocene catalyzed ethylene plastomer selected. Since metallocene catalyzed ethylene plastomers are more expensive than LDPE a cost to benefit trade-off is necessary to balance material cost with processing advantages such as neck-in and product advantages such as biaxially oriented sheet adhesion to the textile. In general, the preferred range of LDPE blended is 10% to 80% by weight.

The preferred stiffness of the imaging element in any direction is between 150 and 300 millinewtons. The bending stiffness of the textile composite base is measured by using the Lorentzen and Wettre stiffness tester, Model 1 6D. The output from is instrument is force, in millinewtons, required to bend the cantilevered, unclasped end of a sample 20 mm long and 38.1 mm wide at an angle of 15 degrees from the unloaded position. A photographic element with stiffness in any direction less than 120 millinewtons can cause transport problems in present photographic processing equipment. Further, photographic element stiffness less than 120 millinewtons is perceived by consumers as low in quality. A photographic element with a stiffness in any direction greater than 330 millinewtons can also cause transport, punching and chopping problems in photographic processing equipment as the stiffness of the photographic element exceeds the capability of present photographic processing equipment.

While melt extrusion polymers are preferred for laminating biaxially oriented polymer sheets to the textile, room temperature adhesive lamination can also be useful. Room temperature adhesive lamination is accomplished by applying an adhesive to either the biaxially oriented polymer sheet or the textile prior to the lamination nip. Suitable adhesives include acrylic pressure sensitive adhesives, UV cure polymer adhesives, and latex based adhesives.

The structure of a preferred photographic base with oriented polyolefin and a textile where the light sensitive silver halide emulsion is coated on the polyethylene layer is as follows. The polymer layers above and below the bonding layers were formed as an integral sheet prior to lamination:

---

Polyethylene exposed surface layer with blue tint
Polypropylene layer containing optical brightener
Polypropylene microvoided layer with 0.55 grams per cubic cm density
Polypropylene layer
Low density polyethylene bonding layer with 0.91 g/cc density
Voided polyester with 0.91 g/cc density
Low density polyethylene bonding layer with 0.91 g/cc density and 12% $TiO_2$
Polyester Fabric core 125 micrometers thick containing 35 yarns/cm.
Low density polyethylene bonding layer with 0.91 g/cc density and 12% $TiO_2$
Copolymer of polyethylene and terpolymer of ethylene, propylene and butylene
Styrene butadiene methacrylate antistatic coating

---

As used herein, the phrase "photographic element" or "imaging element" is a material that utilizes photosensitive silver halide in the formation of images. The photographic elements can be single color elements, multicolor elements or black and white where there is retained silver after processing of the image. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

The photographic emulsions useful for this invention are generally prepared by precipitating silver halide crystals in a colloidal matrix by methods conventional in the art. The colloid is typically a hydrophilic film forming agent such as gelatin, alginic acid, or derivatives thereof.

The crystals formed in the precipitation step are washed and then chemically and spectrally sensitized by adding spectral sensitizing dyes and chemical sensitizers, and by providing a heating step during which the emulsion temperature is raised, typically from 40.degree. C. to 70.degree. C., and maintained for a period of ime. The precipitation and spectral and chemical sensitization methods utilized in preparing the emulsions employed in the invention can be those methods known in the art.

Chemical sensitization of the emulsion typically employs sensitizers such as sulfur-containing compounds, e.g., allyl isothiocyanate, sodium thiosulfate and allyl thiourea; reducing agents, e.g., polyamines and stannous salts; noble metal compounds, e.g., gold, platinum; and polymeric agents, e.g., polyalkylene oxides. As described, heat treatment is employed to complete chemical sensitization. Spectral sensitization is effected with a combination of dyes, which are designed for the wavelength range of interest within the visible or infrared spectrum. It is known to add such dyes both before and after heat treatment.

After spectral sensitization, the emulsion is coated on a support. Various coating techniques include dip coating, air knife coating, curtain coating, and extrusion coating.

The silver halide emulsions utilized in this invention may be comprised of any halide distribution. Thus, they may be comprised of silver chloride, silver bromide, silver bromochloride, silver chlorobromide, silver iodochloride, silver iodobromide, silver bromoiodochloride, silver chloroiodobromide, silver iodobromochloride, and silver iodochlorobromide emulsions. It is preferred, however, that the emulsions be predominantly silver chloride emulsions. By predominantly silver chloride, it is meant that the grains of the emulsion are greater than about 50 mole percent silver chloride. Preferably, they are greater than about 90 mole percent silver chloride; and optimally greater than about 95 mole percent silver chloride.

The silver halide emulsions can contain grains of any size and morphology. Thus, the grains may take the form of cubes, octahedrons, cubo-octahedrons, or any of the other naturally occurring morphologies of cubic lattice type silver halide grains. Further, the grains may be irregular such as spherical grains or tabular grains. Grains having a tabular or cubic morphology are preferred.

The photographic elements of the invention may utilize emulsions as described in The Theory of the Photographic Process, Fourth Edition, T. H. James, Macmillan Publishing Company, Inc., 1977, pages 151–152. Reduction sensitization has been known to improve the photographic sensitivity of silver halide emulsions. While reduction sensitized silver halide emulsions generally exhibit good photographic speed, they often suffer from undesirable fog and poor storage stability.

Reduction sensitization can be performed intentionally by adding reduction sensitizers, chemicals which reduce silver ions to form metallic silver atoms, or by providing a reducing environment such as high pH (excess hydroxide ion) and/or low pAg (excess silver ion). During precipitation of a silver halide emulsion, unintentional reduction sensitization can occur when, for example, silver nitrate or alkali solutions are added rapidly or with poor mixing to form emulsion grains. Also, precipitation of silver halide emulsions in the presence of ripeners (grain growth modifiers) such as thioethers, selenoethers, thioureas, or ammonia tends to facilitate reduction sensitization.

Examples of reduction sensitizers and environments which may be used during precipitation or spectral/chemical sensitization to reduction sensitize an emulsion include ascorbic acid derivatives; tin compounds; polyamine compounds; and thiourea dioxide-based compounds described in U.S. Pat. Nos. 2,487,850; 2,512,925; and British Patent 789,823. Specific examples of reduction sensitizers or conditions, such as dimethylamineborane, stannous chloride, hydrazine, high pH (pH 8–11) and low pAg (pAg 1–7) ripening are discussed by S. Collier in Photographic Science and Engineering, 23, 113 (1979). Examples of processes for preparing intentionally reduction sensitized silver halide emulsions are described in EP 0 348 934 A1 (Yamashita), EP 0 369 491 (Yamashita), EP 0 371 388 (Ohashi), EP 0 396 424 A1 (Takada), EP 0 404 142 A1 (Yamada), and EP 0 435 355 A1 (Makino).

The photographic elements of this invention may use emulsions doped with Group VIII metals such as iridium, rhodium, osmium, and iron as described in Research Disclosure, September 1994, Item 36544, Section I, published by Kenneth Mason Publications, Ltd., Dudley Annex, 12a North Street, Emsworth, Hampshire PO10 7DQ, ENGLAND. Additionally, a general summary of the use of iridium in the sensitization of silver halide emulsions is contained in Carroll, "Iridium Sensitization: A Literature Review," Photographic Science and Engineering, Vol. 24, No. 6, 1980. A method of manufacturing a silver halide emulsion by chemically sensitizing the emulsion in the presence of an iridium salt and a photographic spectral sensitizing dye is described in U.S. Pat. No. 4,693,965. In some cases when such dopants are incorporated, emulsions show an increased fresh fog and a lower contrast sensitometric curve when processed in the color reversal E-6 process as described in The British Journal of Photography Annual, 1982, pages 201–203.

A typical multicolor photographic element of the invention comprises the invention laminated support bearing a cyan dye image-forming unit comprising at least one red-sensitive silver halide emulsion layer having associated therewith at least one cyan dye-forming coupler; a magenta image-forming unit comprising at least one green-sensitive silver halide emulsion layer having associated therewith at least one magenta dye-forming coupler; and a yellow dye image-forming unit comprising at least one blue-sensitive silver halide emulsion layer having associated therewith at least one yellow dye-forming coupler. The element may contain additional layers, such as filter layers, interlayers, overcoat layers, subbing layers, and the like. The support of the invention may also be utilized for black-and-white photographic print elements.

The photographic elements may also contain a transparent magnetic recording layer such as a layer containing magnetic particles on the underside of a transparent support, as in U.S. Pat. Nos. 4,279,945 and 4,302,523. Typically, the element will have a total thickness (excluding the support) of from about 5 to about 30 .mu.m.

The elements of the invention may use materials as disclosed in Research Disclosure 40145, September 1997, particularly the couplers as disclosed in Section II of the Research Disclosure.

In the following Table, reference will be made to (1) Research Disclosure, December 1978, Item 17643, (2) Research Disclosure, December 1989, Item 308119, and (3) Research Disclosure, September 1994, Item 36544, all published by Kenneth Mason Publications, Ltd., Dudley Annex, 12a North Street, Emsworth, Hampshire PO10 7DQ, ENGLAND. The Table and the references cited in the Table are to be read as describing particular components suitable for use in the elements of the invention. The Taole and its cited references also describe suitable ways of preparing, exposing, processing and manipulating the elements, and the images contained therein.

| Reference | Section | Subject Matter |
|---|---|---|
| 1 | I, II | Grain composition, morphology and preparation. |
| 2 | I, II, IX, X, XI, XII, XIV, XV | Emulsion preparation including hardeners, coating aids, addenda, etc. |
| | I, II, 1II, IX | |
| 3 | A & B | |
| 1 | III, IV | Chemical sensitization and spectral sensitization/ desensitization |
| 2 | III, IV | |
| 3 | IV, V | |
| 1 | V | UV dyes, optical brighteners, luminescent dyes |
| 2 | V | |
| 3 | VI | |
| 1 | VI | |
| 2 | VI | Antifoggants and stabilizers |
| 3 | VII | |
| 1 | VIII | Absorbing and scattering materials; Antistatic layers; C & D matting agents |
| 2 | VIII, XIII, XVI | |
| 3 | VIII, IX | |
| 1 | VII | Image-couplers and image-modifying couplers; Dye stabilizers and hue modifiers |
| 2 | VII | |
| 3 | X | |
| 1 | XVII | Supports |
| 2 | XVII | |
| 3 | XV | |
| 3 | XI | Specific layer arrangements |
| 3 | XII, XIII | Negative working emulsions; Direct positive emulsions |
| 2 | XVIII | Exposure |
| 3 | XVI | |
| 1 | XIX, XX | Chemical processing; Developing agents |
| 2 | XIX, XX, XXII | |
| 3 | XVIII, XIX, XX | |
| 3 | XIV | Scanning and digital processing procedures |

The photographic elements can be exposed with various forms of energy which encompass the ultraviolet, visible, and infrared regions of the electromagnetic spectrum, as well as with electron beam, beta radiation, gamma radiation, X ray, alpha particle, neutron radiation, and other forms of corpuscular and wave-like radiant energy in either noncoherent (random phase) forms or coherent (in phase) forms, as produced by lasers. When the photographic elements are intended to be exposed by X rays, they can include features found in conventional radiographic elements.

The imaging elements of this invention can be exposed by means of a collimated beam, to form a latent image, and then processed to form a visible image, preferably by other than heat treatment. A collimated beam is preferred as it allows for digital printing and simultaneous exposure of the imaging layer on the top without significant internal light scatter. A preferred example of a collimated beam is a laser also known as light amplification by stimulated emission of radiation. The laser is preferred because this technology is used widely in a number of digital printing equipment types. Further, the laser provides sufficient energy to simultaneously expose the light sensitive silver halide coating on the top of the display material of this invention without undesirable light scatter. Subsequent processing of the latent image into a visible image is preferably carried out in the known RA-4.TM. (Eastman Kodak Company) Process or other processing systems suitable for developing high chloride emulsions.

The following examples illustrate the practice of this invention. They are not intended to be exhaustive of all possible variations of the invention. Parts and percentages are by weight unless otherwise indicated.

EXAMPLES

In this example a light sensitive color silver halide emulsion was coated on an imaging support containing a fabric core. The support material of the invention was constructed by laminating biaxially oriented sheets to the top and bottom of a polyester woven textile. This example will show the utility of a fabric core imaging element.

The following is a description of the invention and was prepared by extrusion laminating the following top and bottom biaxially oriented polymer sheets to the textile described below:

Top Sheet (Emulsion Side)

A composite sheet consisting of 5 layers identified as L1, L2, L3, L4, and L5. L1 is the thin colored layer on the outside of the package to which the photosensitive silver halide layer was attached. L2 is the layer to which optical brightener and $TiO_2$ was added. The optical brightener used was Hostalux KS manufactured by Ciba-Geigy. A coated extrusion grade anatase $TiO_2$ was added to both L2 and L4. Table 1 below lists the characteristics of the layers of the top biaxially oriented sheet used in this example.

TABLE 1

| Layer | Material | Thickness, $\mu$m |
|---|---|---|
| L1 | LD Polyethylene + color concentrate | 0.75 |
| L2 | Polypropylene + 24% TiO 2 + OB | 6.65 |
| L3 | Voided Polypropylene | 21 |
| L4 | Polypropylene + 18% TiO 2 | 6.85 |
| L5 | Polypropylene | 0.76 |

Textile Used in the Invention;

The woven textile used in this example was a 30 threads/cm polyester fabric that was approximately 125 micrometers in thickness. The surface roughness of the textile was 4 micrometers raw and 2.5 micrometers after lamination. The surface roughness measurement is a measure of the maximum allowable roughness expressed in units of micrometers and by use of the symbol $R_a$. For the irregular profile of the materials of this invention, the roughness average, $R_a$, is the sum of the absolute value of the difference of each discrete data point from the average of all the data divided by the total number of points sampled.

The surface roughness of the emulsion side of each photographic element was measured by a Federal Profiler at two stages of sample preparation, in the woven textile base form and after extrusion lamination of the upper polymer film. The Federal Profiler instrument consists of a motorized drive nip which is tangent to the top surface of the base plate. The sample to be measured is placed on the base plate and fed through the nip. A micrometer assembly is suspended above the base plate. The end of the micrometer spindle provides a reference surface from which the sample thickness can be measured. This flat surface is 0.95 cm diameter and, thus, bridges all fine roughness detail on the upper surface of the sample. Directly below the spindle, and nominally flush with the base plate surface, is a moving hemispherical stylus of the gauge head. This stylus responds to local surface variation as the sample is transported through the gauge. The stylus radius relates to the spatial content that can be sensed. The output of the gauge amplifier is digitized to 12 bits. The sample rate is 500 measurements per 2.5 cm.

Bottom Sheet (Backside);

The bottom biaxially oriented sheet laminated to the backside of invention base was a one-side matte finish, one-side treated biaxially oriented polypropylene sheet (25.6 $\mu$m thick) (d=0.90 g/cc) consisting of a solid oriented polypropylene layer and a skin layer of a mixture of polyethylenes and a terpolymer comprising ethylene, propylene, and butylene. The skin layer was on the bottom and the polypropylene layer and laminated to the textile.

The top sheet used in this example was coextruded and biaxially oriented. The top sheet was melt extrusion laminated to the above woven textile paper base using a metallocene catalyzed ethylene plastomer (SLP 9088) bonding layer manufactured by Exxon Chemical Corp. The metallocene catalyzed ethylene plastomer had a density of 0.900 g/cc and a melt index of 14.0.

A coating was then applied to the laminated bottom biaxially oriented sheet utilized in the invention using a gravure coater to add the high frequency roughness to the backside. The coating consisted of an aqueous solution containing a sodium salt of styrene sulfonic acid. The coverage used was 25 mg per square meter and then dried to achieve a final web temperature between 55° C., the resultant coalesced latex material produced the desired high frequency roughness pattern. In addition to the sodium salt of styrene sulfonic acid, aluminum modified colloidal silicon dioxide particles were added to the aqueous latex material at a concentration of 50 milligrams per square meter. This further enhanced the high frequency roughness.

The L3 layer for the biaxially oriented sheet is microvoided and further described in Table 2 where the refractive index and geometrical thickness is shown for measurements made along a single slice through the L3 layer; they do not imply continuous layers; a slice along another location would yield different but approximately the same thickness. The areas with a refractive index of 1.0 are voids that are filled with air and the remaining layers are polypropylene.

TABLE 2

| Sublayer of L3 | Refractive Index | Thickness, $\mu$m |
|---|---|---|
| 1 | 1.49 | 2.54 |
| 2 | 1 | 1.527 |
| 3 | 1.49 | 2.79 |
| 4 | 1 | 1.016 |
| 5 | 1.49 | 1.778 |
| 6 | 1 | 1.016 |
| 7 | 1.49 | 2.286 |
| 8 | 1 | 1.016 |
| 9 | 1.49 | 2.032 |
| 10 | 1 | 0.762 |
| 11 | 1.49 | 2.032 |
| 12 | 1 | 1.016 |
| 13 | 1.49 | 1.778 |
| 14 | 1 | 1.016 |
| 15 | 1.49 | 2.286 |

Silver chloride emulsions were chemically and spectrally sensitized as described below. A biocide comprising a mixture of N-methyl-isothiazolone and N-methyl-5-chloro-isthiazolone was added after sensitization.

Blue Sensitive Emulsion (Blue EM-1)

A high chloride silver halide emulsion is precipitated by adding approximately equimolar silver nitrate and sodium chloride solutions into a well-stirred reactor containing glutaryldiaminophenyldisulfide, gelatin peptizer and thioether ripener. Cesium pentachloronitrosylosmate(II) dopant is added during the silver halide grain formation for most of the precipitation, followed by the addition of potassium hexacyanoruthenate(II), potassium (5-mehtylthiazole)-pentachloroiridate, a small amount of KI solution, and shelling without any dopant. The resultant emulsion contains cubic shaped grains having edge length of 0.6 $\mu$m. The emulsion is optimally sensitized by the addition of a colloidal suspension of aurous sulfide and heat ramped to 60° C., during which time blue sensitizing dye BSD-4, potassium hexchloroiridate, Lippmann bromide, and 1-(3-acetamidophenyl)-5-mercaptotetrazole were added.

Green Sensitive Emulsion (Green EM-1)

A high chloride silver halide emulsion is precipitated by adding approximately equimolar silver nitrate and sodium chloride solutions into a well-stirred reactor containing gelatin peptizer and thioether ripener. Cesium pentachloronitrosylosmate(II) dopant is added during the silver halide grain formation for most of the precipitation, followed by the addition of potassium (5-methylthiazole)-pentachloroiridate. The resultant emulsion contains cubic shaped grains of 0.3 $\mu$m in edge length size. The emulsion is optimally sensitized by the addition of glutaryldiaminophenyl-disulfide, a colloidal suspension of aurous sulfide and heat ramped to 55° C., during which time potassium hexachloroiridate doped Lippmann bromide, a liquid crystalline suspension of green sensitizing dye GSD-1, and 1-(3-acetamidophenyl)-5-mercaptotetrazole were added.

Red Sensitive Emulsion (Red EM-1)

A high chloride silver halide emulsion is precipitated by adding approximately equimolar silver nitrate and sodium chloride solutions into a well-stirred reactor containing gelatin peptizer and thioether ripener. During the silver halide grain formation, potassium hexacyanoruthenate(II) and potassium (5-methylthiazole)- pentachloroiridate are added. The resultant emulsion contains cubic shaped grains of 0.4 μm in edge length size. The emulsion is optimally sensitized by the addition of glutaryldiaminophenyldisulfide, sodium thiosulfate, tripotassium bis {2-[3-(2-sulfobenzamido)phenyl]-mercaptotetrazole} gold(I) and heat ramped to 64° C., during which time 1-(3-acetamidophenyl)-5-mercaptotetrazole, potassium hexachloroiridate, and potassium bromide are added. The emulsion is then cooled to 40° C., pH adjusted to 6.0, and red sensitizing dye RSD-1 is added.

Coupler dispersions were emulsified by methods well known to the art, and the following layers were coated on the following support:

The following light sensitive silver halide imaging layers were utilized to prepare photographic print materials utilizing the invention support material and the control support material. The following imaging layers were coated utilizing curtain coating:

| Layer | Item | Laydown (g/m$^2$) |
|---|---|---|
| Layer 1 | Blue Sensitive Layer | |
| | Gelatin | 1.3127 |
| | Blue sensitive silver (BM-1) | 0.2399 |
| | Y-4 | 0.4143 |
| | ST-23 | 0.4842 |
| | Tributyl Citrate | 0.2179 |
| | ST-24 | 0.1211 |
| | ST-16 | 0.0095 |
| | Sodium Phenylmercaptotetrazole | 0.0001 |
| | Piperidino hexose reductone | 0.0024 |
| | 5-chloro-2-methyl-4-isothiazolin-3-one/2-methyl-4-isothiazolin-3-one(3/1) | 0.0002 |
| | SF-1 | 0.0366 |
| | Potassium chloride | 0.0204 |
| | Dye-1 | 0.0148 |
| Layer 2 | Interlayer | |
| | Gelatin | 0.7532 |
| | ST-4 | 0.1076 |
| | S-3 | 0.1969 |
| | 5-chloro-2-methyl- 4-isothiazolin-3-one/2-methyl-4-isothiazolin-3-one(3/1) | 0.0001 |
| | Catechol disulfonate | 0.0323 |
| | SF-1 | 0.0081 |
| Layer 3 | Green Sensitive Layer | |
| | Gelatin | 1.1944 |
| | 1) | 0.1011 |
| | M-4 | 0.2077 |
| | Oleyl Alcohol | 0.2174 |
| | S-3 | 0.1119 |
| | ST-21 | 0.0398 |
| | ST-22 | 0.2841 |
| | Dye-2 | 0.0073 |
| | 5-chloro-2-methyl-4-isothiazolin-3-one/2-methyl-4-isothiazolin-3-one(3/1) | 0.0001 |
| | SF-1 | 0.0236 |
| | Potassium chloride | 0.0204 |
| | Sodium Phenylmercaptotetrazole | 0.0007 |
| Layer 4 | M/C Interlayer | |
| | Gelatin | 0.7532 |
| | ST-4 | 0.1076 |

-continued

| Layer | Item | Laydown (g/m$^2$) |
|---|---|---|
| | S-3 | 0.1969 |
| | Acrylamidelt-Butylacrylamide sulfonate copolymer | 0.0541 |
| | Bis-vinylsulfonylmethane | 0.1390 |
| | 3,5-Dinitrobenzoic acid | 0.0001 |
| | Citric acid | 0.0007 |
| | Catechol disulfonate | 0.0323 |
| | 5-chloro-2-methyl-4-isothiazolin-3-one/2-methyl-4-isothiazolin-3-one(3/1) | 0.0001 |
| Layer 5 | Red Sensitive Layer | |
| | Gelatin | 1.3558 |
| | Red Sensitive silver (Red EM-1) | 0.1883 |
| | IC-35 | 0.2324 |
| | IC-36 | 0.0258 |
| | UV-2 | 0.3551 |
| | Dibutyl sebacate | 0.4358 |
| | S-6 | 0.1453 |
| | Dye-3 | 0.0229 |
| | Potassium p-toluenethiosulfonate | 0.0026 |
| | 5-chloro-2-methyl-4-isothiazolin-3-one/2-methyl-4-isothiazolin-3-one(3/1) | 0.0001 |
| | Sodium Phenylmercaptotetrazole | 0.0005 |
| | SF-1 | 0.0524 |
| Layer 6 | UV Overcoat | |
| | Gelatin | 0.8231 |
| | UV-1 | 0.0355 |
| | UV-2 | 0.2034 |
| | ST-4 | 0.0655 |
| | SF-1 | 0.0125 |
| | SF-6 | 0.0797 |
| | 5-chloro-2-methyl-4-isothiazolin-3-one/2-methyl-4-isothiazolin-3-one(3/1) | 0.0001 |
| Layer 7 | SOC | |
| | Gelatin | 0.6456 |
| | Ludox AM ® (colloidal silica) | 0.1614 |
| | Polydimethylsiloxane (DC200 ®) | 0.0202 |
| | 5-chloro-2-methyl-4-isothiazolin-3-one/2-methyl-4-isothiazolin-3 -one(3/1) | 0.0001 |
| | SF-2 | 0.0032 |
| | Tergitol 15-S-5 ® (surfactant) | 0.0020 |
| | SF-1 | 0.0081 |
| | Aerosol TO ® (surfactant) | 0.0029 |

The structure of photographic element of the invention was the following:
Silver halide imaging layers of the example
Top biaxially oriented polyolefin sheet
Polyethylene Methylacrylate adhesive layer with 22% anatase TiO$_2$
Polyester woven textile
Polyethylene Methylacrylate adhesive layer with 4% anatase TiO$_2$
Bottom biaxially oriented polyolefin sheet
Antistat containing semiconductive metal oxide particles In order to protect the edges of the fabric material from edge penetration of the silver halide imaging chemistry, the invention was slit utilizing ultrasonic cutting to cut and seal the edge of the imaging support using fabric as the support material. The ultrasonic slitting method seals the thermoplastic fabric, laminates, and polymer films together to prevent edge penetration due to silver halide photo finishing. The laminated structure of the textile, upper and lower polymer sheets were slit using an ultrasonic slitter. The ultrasonic slitter had a 3000 watt horn with adjustable amplitude. It was operated at 20 Khz at a line speed of 10 meters per minute. The ultrasonic slitting both slit the fabric laminate and sealed the edges by melting the polymer layers together.

The laminated and ultrasonically slit textile imaging element was tested for edge penetration of silver halide chemistry. Using an RA4 developer solution at 23 C for 60 seconds, there was zero millimeters of edge penetration of the chemistry. Conventional photographic paper with resin coated on both sides has an edge penetration of 2.0 millimeters. The laminated structures also prevented stray fibers from the fabric from contaminating silver halide developing chemistry.

The example imaging element was a silver halide image on a laminated support with a textile texture. Creating a laminated structure of a textile adhered on both sides with a polymer sheet with an imaging element eliminated some of the issues surrounding printing onto fabric while still maintaining the look and feel of fabric. By separating the imaging layer and the fabric with a laminated a plastic film the imaging layer took on the texture of the film, but did not soak into the film. Because the imaging chemistry is concentrated at the top of the imaging element, the image has higher chroma and is more saturated. The processing steps of striping the emulsion layer and reattaching it to a cloth to get a textile appearance is eliminated by using the silver halide laminated fabric image element. The silver halide image would be formed directly onto the laminated fabric with the desired surface texture.

This silver halide fabric imaging element could be used as part of a garment, as an advertisement to enhance the texture in the image, or in home decor. The imaging element could be used as custom photographic wallpaper, upholstery, or window treatments. The imaging element allows silver halide and inkjet images to have a fabric look and feel combined with the saturated colors and durability of the laminated structure. This invention allows silver halide and inkjet images to expand their current uses and drive new imaging applications and customization capabilities.

The invention has been described in detail with particular reference to certain preferred embodiments thereof, but it will be understood that variations and modifications can be effected within the spirit and scope of the invention.

What is claimed is:

1. An imaging element comprising at least one image layer and a base wherein said base comprises an upper polymer sheet having an elastic modulus of between 500 and 6,000 MPa said upper sheet being adhered to a textile having a roughness of between 0.8 and 8.0 micrometers, and a lower polymer sheet adhered to said textile wherein said textile further comprises sizing polymers to prevent edge penetration.

2. The imaging element of claim 1 wherein said textile has a roughness of between 4.0 and 6.0 micrometers.

3. The imaging element of claim 1 wherein said upper polymer sheet has an elastic modulus of between 800 and 4,200 MPa.

4. The imaging element of claim 1 wherein said textile has a thickness of between 75 and 750 micrometers.

5. The imaging element of claim 1 wherein said textile has a resistance to edge penetration of less than 2 millimeters after 60 seconds in a 23 C silver halide developing solution.

6. The imaging element of claim 1 wherein said textile comprises a fabric of woven polymer.

7. The imaging element of claim 1 wherein said textile comprises a fabric of woven fiberglass.

8. The imaging element of claim 1 wherein said textile comprises a fabric comprising fire retardant chemistry.

9. The imaging element of claim 8 wherein said fire retardant chemistry comprise brominated aliphatic compounds.

10. The imaging element of claim 1 wherein said textile comprises hollow fibers.

11. The imaging element of claim 1 wherein said textile comprises natural fibers.

12. The imaging element of claim 1 wherein said textile further comprises indicia on at least one of the upper and lower surfaces.

13. The imaging element of claim 1 wherein said upper polymer sheet replicates the surface of said textile.

14. The imaging element of claim 13 wherein the replicating is at least 80%.

15. The imaging element of claim 1 wherein said upper polymer sheet comprises polyester.

16. The imaging element of claim 1 wherein said bottom sheet is adhered to said textile with a pressure sensitive adhesive.

17. The imaging element of claim 16 wherein said lower polymer sheet comprises a release layer on its upper surface.

18. The imaging element of claim 1 wherein said at least one image layer comprises an image formed utilizing photosensitive silver halide.

19. The imaging element of claim 1 wherein said at least one image layer comprises an image formed utilizing ink jet printing.

20. The imaging element of claim 1 wherein said sizing polymers comprise latex polymers.

21. The imaging element of claim 20 wherein said sizing polymers comprise at least one member selected from the group consisting of alkoxysilanes, polyvinyl alcohol, polyvinyl acetate, aqueous epoxies and aqueous polyurethanes.

22. The imaging element of claim 1 further comprising an upper environmental protection layer over said image layer.

23. The imaging element of claim 1 wherein said upper polymer sheet comprises a layer of biaxially oriented microvoided polymer sheet wherein said microvoided polymer sheet comprises a series of microvoids separated by polymer matrix in the vertical direction such that said microvoided polymer sheet when reflecting light has an opalescent appearance.

24. An imaging element comprising at least one image layer and a base wherein said base comprises an upper polymer sheet having an elastic modulus of between 500 and 6,000 MPa said upper sheet being adhered to a textile having a roughness of between 0.8 and 8.0 micrometers, and a lower polymer sheet adhered to said textile, wherein said imaging element has at least one edge wherein said upper polymer sheet and said lower polymer sheet are sealed together.

25. The imaging element of claim 24 wherein the seal between said upper polymer sheet and said lower polymer sheet prevents edge penetration of developer solution.

26. The imaging element of claim 24 wherein the seal between said upper polymer sheet and said lower polymer sheet has a burst strength of at least 5 N.

27. The imaging element of claim 24 wherein said textile has a roughness of between 4.0 and 6.0 micrometers.

28. The imaging element of claim 24 wherein said upper polymer sheet has an elastic modulus of between 800 and 4,200 MPa.

29. The imaging element of claim 24 wherein said textile has a resistance to edge penetration of less than 2 millimeters.

30. The imaging element of claim 24 wherein said textile comprises a fabric of woven polymer.

31. The imaging element of claim 24 wherein said upper polymer sheet replicates the surface of said textile.

32. The imaging element of claim 24 wherein said upper polymer sheet comprises polyester or polyolefin.

33. The imaging element of claim 24 wherein said at least one image layer comprises an image formed utilizing photosensitive silver halide.

34. The imaging element of claim 24 wherein said at least one image layer comprises an image formed utilizing ink jet printing.

35. A method of edge seal comprising providing an imaging element comprising at least one image layer and a base wherein said base comprises an upper polymer sheet having an elastic modulus of between 500 and 6,000 MPa said upper sheet being adhered to a textile having a roughness of between 0.8 and 8.0 micrometers, and a lower polymer sheet adhered to said textile, bringing said imaging element into contact with a cutter, cutting said imaging element into separate sheets and sealing at least one edge of said sheet.

36. The method of claim 35 wherein said cutter comprises an ultrasonic cutter that simultaneously cuts and seals the edges adjacent to the cut.

37. The method of claim 35 wherein said cutter comprises an ultrasonic horn that has a frequency of between 18 and 26 Khz.

38. The method of claim 35 wherein said upper polymer sheet and lower polymer sheet have a glass transition temperature difference of less than 15° C.

39. The method of claim 35 wherein said textile has a glass transition temperature difference from said upper sheet and said lower sheet of less than 15° C.

40. An imaging element comprising at least one image layer and a base wherein said base comprises an upper polymer sheet having an elastic modulus of between 500 and 6,000 MPa said upper sheet being adhered to a textile having a roughness of between 0.8 and 8.0 micrometers, and a lower polymer sheet adhered to said textile wherein said textile comprises a fabric comprising fire retardant chemistry.

41. The imaging element of claim 40 wherein said textile has a roughness of between 4.0 and 6.0 micrometers.

42. The imaging element of claim 40 wherein said upper polymer sheet has an elastic modulus of between 800 and 4,200 MPa.

43. The imaging element of claim 41 wherein said textile has a thickness of between 75 and 750 micrometers.

44. The imaging element of claim 41 wherein said textile has a resistance to edge penetration of less than 2 millimeters after 60 seconds in a 23 C silver halide developing solution.

45. The imaging element of claim 40 wherein said textile comprises a fabric of woven polymer.

46. The imaging element of claim 40 wherein said textile comprises a fabric of woven fiberglass.

47. The imaging element of claim 40 wherein said fire retardant chemistry comprise brominated aliphatic compounds.

48. The imaging element of claim 40 wherein said upper polymer sheet replicates the surface of said textile.

49. The imaging element of claim 48 wherein the replicating is at least 80%.

50. The imaging element of claim 40 wherein said upper polymer sheet comprises polyester.

51. The imaging element of claim 40 wherein said bottom sheet is adhered to said textile with a pressure sensitive adhesive.

52. The imaging element of claim 51 wherein said lower polymer sheet comprises a release layer on its upper surface.

53. The imaging element of claim 40 wherein said at least one image layer comprises an image formed utilizing photosensitive silver halide.

54. The imaging element of claim 40 wherein said at least one image layer comprises an image formed utilizing ink jet printing.

55. The imaging element of claim 40 further comprising an upper environmental protection layer over said image layer.

* * * * *